United States Patent [19]

Kanuma

[11] Patent Number: 4,623,011

[45] Date of Patent: Nov. 18, 1986

[54] TIRE-REINFORCING DIP CORD AND PROCESS FOR PREPARATION THEREOF

[75] Inventor: Tadao Kanuma, Kyoto, Japan

[73] Assignee: Asahi Kasei Kogyo Kabushiki Kaisha, Japan

[21] Appl. No.: 564,003

[22] Filed: Dec. 21, 1983

[51] Int. Cl.$^4$ .......................... B60C 9/00; D02G 3/48
[52] U.S. Cl. ................... 152/451; 152/565; 156/910; 428/475.5; 57/250; 57/902
[58] Field of Search ............................ 156/910, 110.1; 139/426; 525/420; 428/475.5; 57/250, 295, 310, 902; 152/451, 527, 556, 565

[56] References Cited

U.S. PATENT DOCUMENTS

| | | | |
|---|---|---|---|
| 3,342,762 | 9/1967 | Crovatt | 152/359 |
| 3,545,911 | 12/1970 | Papero et al. | 152/359 |
| 3,575,761 | 4/1971 | Funsch et al. | 152/359 |
| 3,610,311 | 10/1971 | Simons | 152/359 |
| 3,614,864 | 10/1971 | Daimler et al. | 152/359 |

Primary Examiner—Lois E. Boland
Attorney, Agent, or Firm—Finnegan, Henderson, Farabow, Garrett & Dunner

[57] ABSTRACT

A tire-reinforcing dip cord composed of nylon 6 and/or nylon 66 fiber is described. The dip cord has (1) a strength at break of at least 8.2 g/d, (2) an elongation of at least 18% under a load of 8 g/d, (3) a gradient not larger than 0.75 in the load-elongation curve immediately before break, and (4) a cord diameter variation ratio ($D/D_o$) ($D$=cord diameter under a load of 450 g and $D_o$=cord diameter under no load) not larger than 0.65. The dip cord is prepared by treating a nylon 6 and/or nylon 66 cord yarn with an adhesive wherein at least one of the following processes (i) and (ii) is employed: (i) the adhesive treatment is carried out under elongation of at least 3%, and (ii) as the adhesive, a liquid mixture of a resorcinol/formaldehyde (R/F) condensate and a rubber latex is used, in which at least 20 wt. % of the condensate has a R/F molar ratio of 1/1.9–1/1.

6 Claims, 2 Drawing Figures

TIRE-REINFORCING DIP CORD AND PROCESS FOR PREPARATION THEREOF

BACKGROUND OF THE INVENTION (1) Field of the Invention

This invention relates to a tire-reinforcing dip cord. More particularly, it relates to a tire-reinforcing dip cord which has a high strength, a high toughness and a high softness and which can reduce the weight of a tire without degradation of the properties of the tire.

(2) Description of the Prior Art

A tire-reinforcing material is ordinarily used in the form of a cord fabric. A dip cord constitutes a warp of this cord fabric, and the dip cord is ordinarily prepared by imparting first and second twists to a plurality of yarns, applying an adhesive, for example, an aqueous dispersion formed by adding a rubber latex to a polyhydric phenol/formaldehyde condensate (hereinafter referred to as "RF/L" for brevity) to the resulting cord and heat-setting RF/L.

Among tire-reinforcing materials, nylon fibers have excellent strength, durability and heat resistance. Accordingly, tire-reinforcing materials composed of nylon fibers are used for large tires for trucks or buses, construction vehicles, air crafts and the like. However, in case of these large tires, the amount of the reinforcing material used for each tire is much larger than in case of tires for ordinary passenger cars, and a large quantity of energy and a large fuel expense are necessary.

With recent increase in the price of the fuel, it is desired to save the energy quantity and the fuel expense, and it also is eagerly desired to reduce the weight of a tire by reducing the number of plies or ends of the reinforcing material. If this reduction of the tire weight is attained, it is expected to improve the fatigue resistance because of reduction of the quantity of heat generated during driving and also improve the productivity at the tire-forming step. Accordingly, it is eagerly desired to develop nylon fibers having a much higher strength than the nylon fibers used in this field at the present.

It is known that a nylon fibrous material having high strengths can ordinarily be prepared by spinning a polymer having a high degree of polymerization and drawing the spun fibers at a high draw ratio. When fibers drawn at a high draw ratio are used as a tire-reinforcing material, the strengths are reduced at the dipping step or at the vulcanizing step of integrating the fibers with a rubber. Furthermore, the obtained dip cord is extremely hard, and the operation adaptability is reduced at the tire-forming step and the toughness having influences on the properties of the tire such as the durability and impact resistance is drastically reduced. Incidentally, the toughness means the area of the load-elongation curve but for convenience's sake, the toughness is calculated according to the equation of (strength at break)×(elongation at break)×$\frac{1}{2}$.

We made various attempts to increase the strength of nylon fibers per se. However, if the customary dipping method is adopted, the strength is not increased to a level allowing reduction of the weight of a tire even when such high strength nylon fibers are used, and the tire-reinforcing dip cord is rigid and has a poor toughness.

Accordingly, we furthered our researches and found that if certain specific properties are given to a dip cord by adopting specific means, the weight of a tire can be reduced without deterioration of the properties of the tire. Namely, at first, we noted a phenomenon in which the strength at break of a dip cord is improved by mechanical softening means, for example, by rubbing the cord under tension on an edge of an article. In the conventional cord-dipping method, an adhesive permeates into the interior of the cord to form a adhesive layer between filaments in the peripheral portion of the cord. The outermost adhesive layer is effectively utilized for bonding the cord to a rubber. However, the adhesive among the filaments strongly restricts the movements of the filaments, resulting in increase of the hardness. In the dip cord obtained according to this conventional method, only the bonding property is taken into consideration, and the dip cord contains an excess of the adhesive making no contribution to the bonding property. This excess of the adhesive inhibits the movement of the filaments corresponding to the tension at the measurement of the strength of the dip cord and increases the non-uniform strain in the section of the dip cord, with the result that the strength and elongation characteristics are reduced.

SUMMARY OF THE INVENTION

It is a primary object of the present invention to provide a tire-reinforcing dip cord having a high strength, a high toughness and a high softness while maintaining an adhesion at a level obtained according to the conventional method, and a process for preparing this dip cord.

Another object of the present invention is to manifest the high strength, high toughness and high softness inherently possessed by a cord by avoiding use of an excessive adhesive having bad influences on the strength and elongation characteristics of a dip cord and/or by dipping the cord with an adhesive comprising specific ingredients.

More specifically, in accordance with the present invention, there is provided a tire-reinforcing dip cord composed of fibers of nylon 6 and/or nylon 66, said dip cord having the following characteristics:

(1) a strength at break of at least 8.2 g/d;

(2) an elongation of at least 18% under a load of 8 g/d;

(3) a gradient (T.E. coefficient) not larger than 0.75 in the load-elongation curve immediately before break; and (4) a cord diameter variation ratio (V.G. value) not larger than 0.65, said cord diameter variation ratio being expressed by the ratio (D/Do) of the cord diameter (D) under a load of 450 g to the cord diameter (Do) under no load.

DETAILED DESCRIPTION OF THE PREFERRED EMBODIMENTS

It is important that the dip cord of the present invention should have a strength at break of at least 8.2 g/d, preferably 8.4 to 9.0 g/d. If the strength at break of the dip cord is lower than 8.2 g/d, it is impossible to reduce the weight of the tire by reducing the number of plies of the reinforcing material. Incidentally, the denier d referred to herein is the denier of the dip cord containing the solids of RF/L, having an intended twist number and having a water content of 4.5%.

In the present invention, it is indispensable that the elongation under a load of 8 g/d should be at least 18%, preferably 18 to 30%. If the elongation under a load of 8 g/d is lower than 18%, the energy at break, obtained from the area of the load-elongation curve of the cord, is small, and therefore, the dip cord is not satisfactory as the tire-reinforcing material and the properties of the tire are degraded.

It also is indispensable that the gradient of the load-elongation curve of the dip cord immediately before break should be gentle, that is, the T.E. coefficient should be small and not larger than 0.75, preferably 0.30 to 0.70. If the T.E. coefficient exceeds 0.75, reduction of the tenacity at the subsequent processing step, for example, the vulcanization step, is conspicuous and the properties of the tire, especially the impact resistance and durability, are degraded.

The dip cord of the present invention has such a high softness as not possessed by a conventional high-strength cord at all. Namely, in the dip cord of the present invention, it is important that the dip cord diameter variation ratio (V.G. value) of the diameter D of the dip cord under a load of 450 g to the diameter Do of the dip cord under no load, that is, the ratio D/Do, should be not larger than 0.65, preferably 0.40 to 0.60. If the V.G. value exceeds 0.65, that is, if the dip cord is rigid, the toughness is low and the operation adaptability at the tire-preparing step is reduced.

Incidentally, the strength at break and the elongation under a load of 8 g/d are determined by allowing a cord to stand still in an atmosphere maintained at a temperature of 24° C. and a relative humidity of 55% for 72 hours after the dipping operation, carrying out the measurement on ten samples according to JIS L-1017 and calculating mean values. The gradient of the load-elongation curve immediately before break is determined by carrying out the measurement under the above-mentioned conditions, recording the obtained data on a plotting paper and drawing a line connecting the break point of the obtained curve to the point of (the elongation at break $-1.0$) %.

Figure 1:
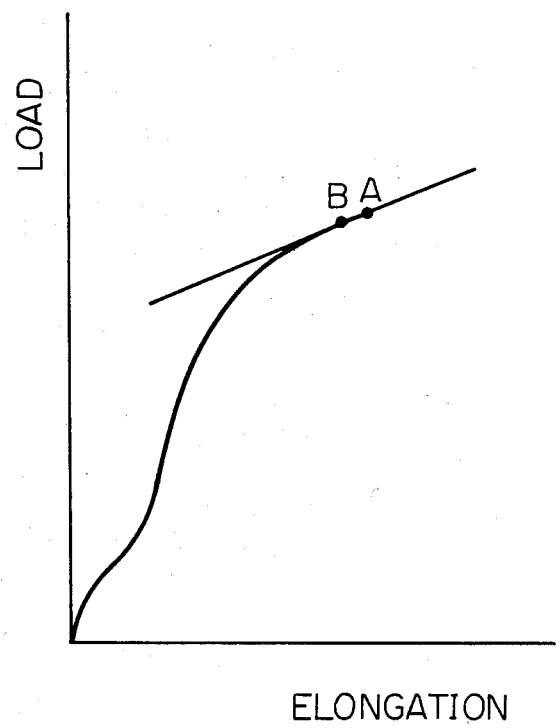
FIG. 1 is a diagram illustrating a load-elongation curve of a dip cord according to the present invention; and, FIG. 2 is a diagram illustrating an embodiment of the apparatus for preparing a dip cord according to the present invention.

FIG. 1 is a diagram of the load-elongation curve, wherein A indicates the point at break and B indicates the point of (the elongation at break $-1.0$) %. The gradient immediately before break, that is, the T.E. coefficient, can be obtained by drawing a line connecting the point A to the point B.

The V.G. value is determined by allowing a sample to stand in the same atmosphere as adopted for the measurement of the strength and elongation and calculating the ratio of the cord diameters measured by a dial gauge described in JIS L-1017. Namely, a measuring stand having a diameter of about 40 mm and a measuring leg having a diameter of about 10 mm are used, and the measuring leg is let to fall down from a height of about 6.5 mm for the measurement. Two samples are set to intersect each other at right angles under no tension so that the crossing point is located at the center of the measuring leg. At first, the cord diameter Do is measured in the state where there is no load on the measuring leg. Then, a load of 450 g is applied onto the measuring leg and the measuring leg is let to fall down on the samples, and after the lapse of 1 minute, the cord diameter D is measured. The V.G. value is expressed by the ratio D/Do, and a smaller V.G. value indicates a softer cord.

The tire-reinforcing dip cord of the present invention satisfies the above-mentioned constitutional requirements, and in connection with other properties, the dip cord of the present invention has values possessed by ordinary tire-reinforcing dip cords.

More specifically, the intermediate elongation, that is, the elongation under a load of 2.68 g/D (D represents the total denier of the starting filament yarn constituting the cord), is 7 to 11%, preferably 8 to 10%, and the dry heat shrinkage, that is, the free shrinkage at 160° C. for 30 minutes, is 2 to 9%, preferably 3 to 8%. In connection with the twist number, the twist coefficient K calculated by the equation of $K = T \times \sqrt{D}$ in which T stands for the twist number per 10 cm and D stands for the total denier of the cord-consistituting yarn is in the range of $1{,}700 \leq K \leq 2{,}200$, preferably $1{,}800 \leq K \leq 2{,}100$. The amount of an adhesive applied is ordinarily 3 to 7% by weight, preferably 4 to 6% by weight.

The process for the preparation of the dip cord of the present invention will now be described.

In preparing the tire-reinforcing dip cord of the present invention by treating a tire-reinforcing cord composed of fibers of nylon 6 and/or nylon 66 with an adhesive, the following preparation processes are adopted alone or in combination.

Process A:

Prior to the adhesive treatment, the cord is subjected to a heat treatment under tension and is then cooled.

Process B:

The adhesive is applied to the cord under elongation of at least 3%.

Process C:

The adhesive used is a liquid mixture comprising a resorcinol/formaldehyde condensate and a rubber latex (hereinafter referred to as "RF/L" for brevity) in which the resorcinol/formalin molar ratio (hereinafter referred to as "R/F ratio" for brevity) is in the range of from 1/1.9 to 1/1 in at least 20% by weight of the resorcinol/formaldehyde condensate (hereinafter referred to as "R/F" for brevity).

In the above-mentioned process A, the heat treatment under tension means that the cord is treated under elongation of at least 2%, preferably 3 to 10%, at a temperature of at least 160° C., preferably at least 180° C., and lower than the melting point for at least 10 seconds, preferably at least 20 seconds. In order to enhance the effect of the heat treatment, a substance having no bad influences on the physical properties of the cord, for example, water or steam, may be applied to the cord prior to the heat treatment. The heat treatment is accomplished by customary means, for example, hot air heating, super-heated steam heating, hot roll heating, infrared ray heating or induction heating.

Cooling should be conducted for a time as short as possible, for example, within 1 minute, preferably, within 40 seconds, subsequently to the heat treatment. By this cooling, the dense structure of the cord given by the heat treatment is fixed and immobilized. This cooling step is indispensable, and if this cooling step is omitted, the intended improvement of the physical properties cannot be attained. Accordingly, it is necessary that the cooling should be conducted under tension and it is preferred that the cooling be conducted under the same elongation as adopted at the heat treatment. The cooling temperature is a temperature capable of retaining the heat treatment effect even in the relaxed state, for example, 50° to 60° C., preferably a temperature close to room temperature. Forced cooling using, for example, cold air cooling or cold roll cooling is preferred as the cooling means, but natural cooling such as standing at room temperature or exposure to room temperature may be adopted. In short, the cooling means is not particularly critical.

In the process A, the heat treatment, cooling and dipping may be conducted in a continuous manner, or there may be adopted a method in which the heat-treated and then cooled cord is once wound and the cord is then dipped.

Figure 2:
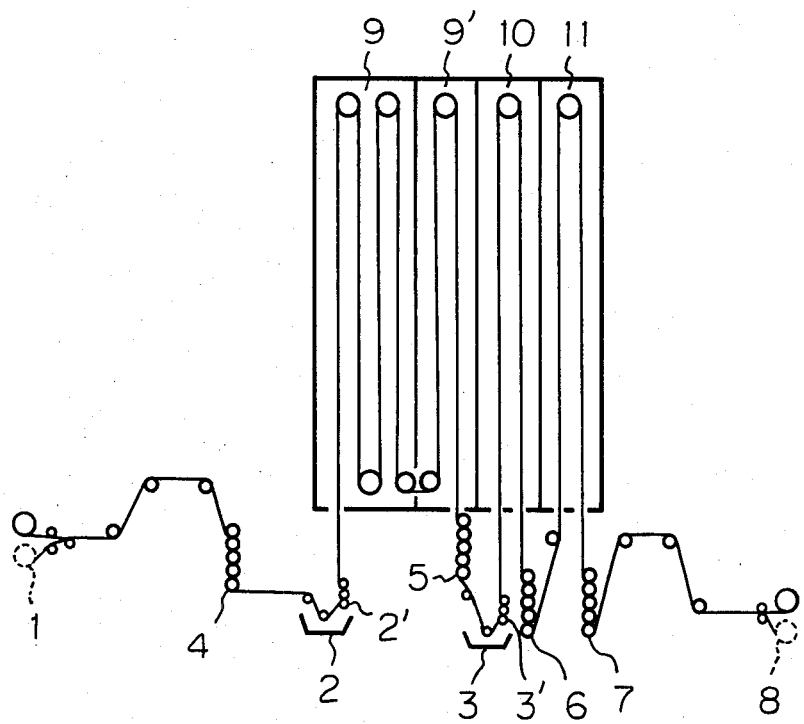

The process A will now be described with reference to the dip-coating treatment apparatus shown in FIG. 2. Referring to FIG. 2, a cord to which first and second twists have been given is withdrawn from a feed device 1 and heat-treated in the first half 9 of a first zone dipping device 2 while a controlled tension is given to the cord between tension-controlling devices 4 and 5. The heat-treated cord is cooled in the second half 9' of the first zone and/or in the device 5 which can act as cooling means in addition to tension-controlling means. The cooled cord is dipped in an adhesive in a dipping device 3 and the excessive adhesive is squeezed in a liquid-squeezing device 3'. Then, the cord is dried in a second zone 10 and then introduced into a third zone 11 where the adhesive is cured. The tension in the first zone 9 plus 9' is controlled between the tension-controlling device 4 or a liquid-squeezing device 2' and the tension-controlling device 5. The tension in the second zone 10 is controlled between the tension-controlling device 5 or the liquid-squeezing device 3' and a tension-controlling device 6. The tension in the third zone 11 is controlled between the tension-controlling device 6 and a tension-controlling device 7. The cured dip cord is wound up by a device 8.

In the above-mentioned process B it is indispensable that the dipping treatment should be carried out in the state where the cord is kept under substantial elongation. The elongation ratio determined from the difference of the length of the cord after and before the dipping treatment should be at least 3%, preferably at least 5%. If the elongation ratio is lower than 3%, the strength and softness characteristics of the dip cord cannot be improved. The elongation ratio may be selected according to the kind of the fibrous material constituting the cord, the twist number and the fineness of fibers, but the elongation ratio should not exceed the elongation at break and it is preferred that the elongation ratio be not more than 80% of the elongation at break.

The above-mentioned process B will now be described with reference to the dip-coating treatment apparatus shown in FIG. 2.

Referring to FIG. 2, a tension is given between 4 and 2' or between 5 and 3' to the cord obtained by giving first and second twists to the starting yarn, and the cord is dipped in an adhesive liquid at 2 or 3. The elongation ratio determined from the difference of the length of the cord between 4 and 2' or between 5 and 3' is adjusted to at least 3%.

In the above-mentioned process C, it is important that an adhesive comprising specific ingredients should be used.

RF/L customarily used for dipping a nylon cord comprises R/F in which the R/F ratio is in the range of from $\frac{1}{3}$ to $\frac{1}{2}$. If a high-strength nylon cord is dipped with this conventional RF/L, the dip cord is hard and it is impossible to obtain sufficient strength and toughness. According to the process C wherein RF/L formed by incorporating R/F, that has not been customarily used for dipping a nylon cord, at a specific ratio is used, there can be obtained a dip cord which is very soft and is highly improved in the strength and toughness and in which the adhesion is maintained at a level comparable to the adhesion attainable by the conventional technique.

RF/L used in the process C is characterized in that at least 20% by weight, preferably at least 40% by weight, of R/F has an R/F ratio ranging from 1/1.9 to 1/1, preferably from 1/1.7 to 1/1.2.

If the content of R/F having the above-mentioned R/F ratio is lower than 20% by weight, the physical properties of the dip cord cannot be improved. Furthermore, if the R/F ratio is lower than 1/1.9, the physical properties of the dip cord cannot be improved. If the R/F ratio is higher than 1/1, a high adhesion cannot be maintained.

Of all R/F used for RF/L, RF other than the above-mentioned R/F having an R/F ratio ranging from 1/1.9 to 1/1 may be at least one member selected from R/F having an R/F ratio ranging from $\frac{1}{3}$ to $\frac{1}{2}$, customarily used for dipping nylon cords. Mixing of R/F components may be accomplished by mixing RF components separately prepared, or there may be adopted a method in which RF/L is formed for each R/F and the so-formed RF/L liquids are mixed together. An alkali catalyst, for example, an alkali metal hydroxide or ammonia, may be used for formation of R/F.

In a typical embodiment of the process C, the cord obtained by imparting first and second twists to the starting filament yarn is dipped with RF/L at the dipping device 2 in the dip-coating treatment apparatus shown in FIG. 2.

The above-mentioned processes A through C may be adopted independently, but it is preferred that two or more of these processes be adopted in combination. Namely, there may be adopted (i) a combination of the processes A and C wherein the cord is heat-treated under tension and cooled and then the cord is dipped with RF/L according to the process C, (ii) a combination of the processes B and C wherein the cord is dipped with RF/L according to the process C under elogation of at least 3%, and (iii) a combination of the processes A, B and C wherein the cord is heat-treated under tension and cooled and then the cord is dipped with RF/L according to the process C under elongation of at least 3%.

A customarily used rubber latex may be used as the rubber latex of RF/L in the above-mentioned processes. For example, there may appropriately be used a natural rubber latex and a styrene/butadiene rubber latex, a styrene/butadiene/vinyl pyridine terpolyomer latex, and an acrylonitrile/butadiene rubber latex.

RF/L may further comprise an antioxidant, an aging-preventing agent, a thickener, a defoaming agent, a softening agent, a levelling agent, a pigment, carbon black and other additives.

The immersion method is ordinarily adopted for the dipping treatment, but is not limited to the immersion method. Other methods customarily used for the preparation of dip cords, for example, the coating method and the spraying method, may be adopted.

Furthermore, at the final stage of the dipping step, the customary softening operation of rubbing the cord under tension on an edge of an article may be carried out.

The nylon used in the present invention is nylon 6 and/or nylon 66. For example, there can be mentioned nylon 6, nylon 66, a nylon 6/66 copolymer and a nylon 6/nylon 66 blend. The nylon 6 and/or nylon 66 used in the present invention may contain small proportions of units derived from other amide-forming compounds such as aliphatic dicarboxylic acids, aromatic dicarboxylic acids, aliphatic amines and aromatic amines.

The cord used for the preparation of the dip cord of the present invention may contain additives contained in an ordinary starting yarn for a nylon tire cord, such as a heat stabilizer, an antioxidant, a light stabilizer, a lubricant, a plasticizer and a thickener.

In order to enhance the effect of the present invention, it is preferred that a starting yarn having a strength of at least 10 g/d be used. Either nylon 6 or nylon 66 can be used, but nylon 66 is preferable because of the good heat resistance. A high polymer having a relative viscosity of at least 70, especially at least 75, as measured in formic acid is preferred.

According to the above-mentioned process, there can be obtained an excellent tire-reinforcing dip cord composed of nylon 6 and/or nylon 66 which is highly improved in the strength and elongation characteristics while maintianing the adhesion at a level comparable to the adhesion attained by the conventional technique and which is excellent in the tire-weight-saving effect, durability and impact resistance.

The present invention will now be described in detail with reference to the following examples that by no means limit the scope of the invention.

In the examples, "the formic acid relative viscosity" is the relative viscosity of a polymer as measured in an aqueous 90% formic acid solution at a polymer concentration of 8.4% by weight at 25° C., and "the sulfuric acid relative viscosity" is the relative viscosity of a polymer as measured in an aqueous 95.5% sulfuric acid solution at a polymer concentration of 1.0% by weight at 25° C. By "the adhesion" is meant the force necessary for pulling out the dip cord from the rubber block. The dip cord is inserted and gripped between rubber sheets for a carcass, having a thickness of 5 mm, and vulcanization is carried out in a mold having an embedding length of 1 cm at 150° C. for 30 minutes under a gauge pressure of 35 kg/cm². The dip cord is pulled out from the resulting rubber block after the vulcanization. The force necessary for pulling out the dip cord is defined as the adhesion.

The strength at break and elongation at break are those determined according to the method of JIS (Japanese Industrial Standard) L-1017. The toughness is defined by the following equation.

$$\text{Toughness} = (\text{strength}) \times (\text{elongation}) \times \tfrac{1}{2}$$

RF/L liquids used in the examples are shown in Table 1. RF/L is prepared by stirring the R/F liquid for 6 hours, adding a rubber latex and stirring the mixture for 30 minutes.

TABLE 1

|  | RF/L Liquid | | | | |
| --- | --- | --- | --- | --- | --- |
|  | (1) | (2) | (3) | (4) | |
| R/F Liquid | (A) | (B) | (C) | (D) | (E) |
| Resorcinol | 11 | 11 | 11 | 11 | 11 |
| Formalin (37% | 17.8 | 12.2 | 17.8 | 10.1 | 16.2 |

TABLE 1-continued

|  | RF/L Liquid | | | |
| --- | --- | --- | --- | --- |
|  | (1) | (2) | (3) | (4) |
| aqueous solution) | | | | |
| Sodium hydroxide | 0.3 | 0.6 | 0.3 | 0.6 | 0.3 |
| Water | 236.9 | 242.5 | 236.9 | 244.3 | 238.5 |
| R/F ratio | 1/2.2 | 1/1.5 | 1/2.2 | 1/1.25 | 1/2 |
| RF/L Liquid | | | | |
| R/F liquid | (A) 133 + (B) 133 | (C) 266 | (D) 266 | (E) 266 |
| Pyratex* | 244 | 244 | 244 | 244 |
| Water | 60 | 60 | 60 | 60 |
| Ammonia (28% solution) | 11.3 | 11.3 | 11.3 | 11.3 |

Note
Pyratex: styrene/butadiene/vinylpyridine terpolymer latex supplied by Sumitomo-Naugatax Co.

EXAMPLE 1

A high polymer having a formic acid relative viscosity of 88.0 was obtained by polymerizing a chip of nylon 66 having a formic acid relative viscosity of 32.0 at 210° C. in a nitrogen atmosphere. This high polymer was melt-spun at 300° C. through a spinneret having 210 orifices having a diameter of 0.25 mm. The spun filaments were passed through a heating chimney maintained at 350° C. and then cooled. An oiling agent was applied to the filaments, and then the filaments were subjected to the drawing and heat-setting treatment in three stages by first through fourth Nelson rollers maintained at 80°, 210°, 220° and 245° C., respectively. The drawn filaments were wound at a rate of 1,600 m/min. The draw ratio was 6.05. The thus obtained starting filament yarn was of 1,260 denier/210 filaments, and it had a formic acid relative viscosity of 80.5, a strength of 10.5 g/denier and an elongation of 21.5%.

First twists (Z twists) were given at a twist number of 39 turns per cm to two starting filament yarns, independently, and the two filament yarns were doubled and then second twists (S twists) were given at a twist number of 39 turns per cm to obtain a yarn of 1260 denier/2. The yarn was heat-treated, cooled and dipped in the dip cord-preparing apparatus shown in FIG. 2. The temperature of the first half 9 of the first zone was 225° C. and the residence time in this zone 9 was 100 seconds. The yarn was not heated in the second half 9' of the first zone and this zone 9' was used as a cooling zone. The residence time in this zone 9' was 50 seconds. The cord was cooled to a level close to room temperature at the device 5. The ratio of elongation in the zones 9 and 9' was 7.5%. Then, the yarn was immersed in RF/L (2) shown in Table 1 at the device 3, and the yarn was treated at 150° C. at an elongation ratio of 1.1% for 50 seconds in the second zone 10 and was then treated at 215° C. at an elongation of −2.0% for 50 seconds in the third zone 11. The properties of the obtained dip cord are shown in Table 2.

EXAMPLE 2

Starting filament yarns of 1,890 denier/312 filaments composed of nylon 66, which had a formic acid relative viscosity of 81.7, a strength of 10.4 g/denier and an elongation of 20.9%, were prepared in the same manner as described in Example 1. First and second twists were given at twist numbers of 32 turns per 10 cm, respectively, to the yarns to form a yarn of 1,890 denier/2.

Using the dip cord-preparing apparatus shown in FIG. 2, the yarn was heat-set, cooled and wound, and the yarn was dipped in the same apparatus. Namely, at first, the cord was immersed in water at the device 2, and the cord was treated at 150° C. for 120 seconds at an elongation ratio of 5.6% in the first zones 9 and 9' and then treated at 230° C. for 40 seconds at an elongation ratio of 1.2% in the second zone 10. Then, the cord was cooled for 40 seconds at an elongation ratio of 1.2% in the third zone 11 as the cooling zone. The cord was once wound at the device 8. Then, the cord was set at the device 1 again and was immersed in RF/L (2) shown in Table 1 at the device 2. The cord was treated at 150° C. at an elongaton ratio of 1.5% for 90 seconds in the first zones 9 and 9' and treated at 220° C. at an elongation ratio of 0.8% for 30 seconds in the second zone 10, and finally the cord was treated at 220° C. at an elongation ratio of −2.6% for 30 seconds in the third zone 11. The properties of the obtained dip cord are shown in Table 2.

COMPARATIVE EXAMPLE 1

The procedures of Example 2 were repeated in the same manner except that heat setting and cooling were not carried out but only the dipping operation was carried out. Namely, the cord was immersed in RF/L (2) shown in Table 2 at the device 2, treated at 150° C. at an elongation ratio of 6.7% for 120 seconds in the first zones 9 and 9', treated at 230° C. at an elongation ratio of 1.2% for 40 seconds in the second zone 10 and finally treated at 230° C. at an elongation ratio of −2.6% for 40 seconds in the third zone 11. The properties of the obtained dip cord are shown in Table 2.

It was seen that the dip cord prepared according to the conventional process is low in strength and is insufficient in elongation at break and toughness.

COMPARATIVE EXAMPLE 2

The procedures of Example 1 were repeated in the same manner except that cooling in the zone 9' and the device 5 was not carried out, but only heat setting and dipping were carried out. The properties of the obtained dip cord are shown in Table 2. It is seen that if cooling is not effected, the improvement of the strength and toughness is insufficient.

COMPARATIVE EXAMPLE 3

In the same manner as described in Example 1, starting yarns of 1,260 denier/210 filaments were prepared from a polymer having a medium degree of polymerization characterized by a formic acid relative viscosity of 64.0. The starting yarns had a strength of 9.4 g/denier and an elongation of 20.7%. Heat setting, cooling and dipping (1) were carried out in the same manner as described in Example 1, or dipping (2) was carried out in the same manner as described in Comparative Example 1. The properties of the obtained dip cord are shown in Table 2.

TABLE 2

|  | Strength (g/d) at Break | Elongation (%) under Load of 8 g/d | T.E. Coefficient | V.G. Value | Toughness | Adhesion (kg/cm) |
| --- | --- | --- | --- | --- | --- | --- |
| Example 1 | 8.6 | 19.3 | 0.58 | 0.58 | 100 | 17.2 |
| Example 2 | 8.7 | 18.8 | 0.54 | 0.55 | 103 | 19.6 |
| Comparative Example 1 | 8.2 | 19.0 | 0.80 | 0.71 | 84 | 19.9 |
| Comparative Example 2 | 8.3 | 20.6 | 0.78 | 0.64 | 90 | 17.0 |
| Comparative Example 3-(1) | 8.1 | 21.3 | 0.62 | 0.60 | 89 | 17.3 |
| Comparative Example 3-(2) | 7.9 | — | 0.77 | 0.71 | 84 | 17.6 |

EXAMPLE 3

A yarn of 1,260 D/2 was prepared according to the method of Example 1, and the yarn was dipped in the dip cord-preparing apparatus shown in FIG. 2. More specifically, a tension of 3 kg/cord was applied between 4 and 2' and the cord was immersed in RF/L (2) shown in Table 1 at the device 2. The cord was treated at 150° C. under a tension of 2.0 kg/cord for 120 seconds in the first zones 9 and 9', treated at 225° C. under a tension of 2.8 kg/cord for 40 seconds in the second zone 10 and treated at 225° C. under a tension of 1.9 kg/cord for 40 seconds in the third zone 11. The elongation ratio at the dipping step was 5.6%. The properties of the obtained dip cord are shown in Table 3.

EXAMPLE 4

A yarn of 1,890 D/2 was prepared according to the method of Example 2. Then, the cord was immersed in RF/L (3) shown in Table 1 at the device 2 in the dip cord-preparing apparatus shown in FIG. 1 while applying a tension described below in the first zones 9 and 9' and changing the elongation ratio at the dipping step. Namely, the cord was treated at 160° C. under a tension of 1.0 to 4.8 kg/cord for 120 seconds in the first zones 9 and 9', treated at 232° C. under a tension of 4.8 kg/cord for 40 seconds in the second zone 10 and treated at 232° C. under a tension of 3.6 kg/cord for 40 seconds in the third zone. The elongation ratio adopted at the dipping step and the properties of the obtained dip cord are shown in Table 3.

COMPARATIVE EXAMPLE 4

The procedures of Example 3 were repeated in the same manner except that the dipping operation was carried out without applying any tension between 4 and 2'. The properties of the obtained dip cord are shown in Table 3.

It is seen that the cord dipped according to the conventional method has a high strength but the softness is insufficient and the toughness is low.

COMPARATIVE EXAMPLE 5

The procedures of Example 3 were repeated in the same manner except that the dipping operation was carried out while applying a tension of 1.5 kg/cord between 4 and 2'. The elongation ratio at the dipping step was 2.6%. The properties of the obtained dip cord are shown in Table 3.

It is seen that when the elongation ratio is low, the dip cord is soft but the strength and elongation characteristics are not sufficiently improved.

COMPARATIVE EXAMPLE 6

According to the method of Example 1, a nylon 66 polymer having a formic acid relative viscosity of 65.0 was melt-spun to prepare a starting filament yarn of 1,260 denier/210 filaments. The draw ratio was 6.25. The obtained starting yarn had a strength of 9.9 g/denier and an elongation of 14.8%. In the same manner as described in Example 3, twisting and dipping were carried out. The properties of the obtained dip cord are shown in Table 3.

It is seen that a dip cord prepared from a starting yarn drawn at a high draw ratio has a high strength but the cord is rigid and the toughness is low.

the R/F (D) component shown in Table 4 was attained. The dipping operation was carried out by using the so-prepared dipping liquid in the following manner. The cord was treated at 160° C. under a tension of 2.4 kg/cord for 120 seconds in the first zones 9 and 9', treated at 232° C. under a tension of 4.8 kg/cord for 40 seconds in the second zone 10 and treated at 232° C. under a tension of 3.6 kg/cord for 40 seconds in the third zone 11. The stirring time for the preparation of the dipping liquid was the same as in Example 5. The properties of the obtained dip cord are shown in Table 4.

COMPARATIVE EXAMPLE 7

The dipping operation was carried out in the same manner as in Example 5 except that RF/L (4) shown in Table 1 was used as the dipping liquid. The properties

TABLE 3

| | Elongation (%) at Dipping Step | Strength (g/d) at Break | Elongation (%) under Load of 8 g/d | T.E. Coefficient | V.G. value | Toughness | Adhesion (kg/cm) |
|---|---|---|---|---|---|---|---|
| Example 3 | 5.6 | 8.5 | 19.5 | 0.60 | 0.57 | 94 | 17.5 |
| Example 4 | 3.2 | 8.4 | 19.3 | 0.67 | 0.61 | 92 | 20.1 |
| Example 4 | 5.4 | 8.6 | 19.1 | 0.62 | 0.59 | 95 | 19.8 |
| Example 4 | 7.9 | 8.7 | 19.0 | 0.57 | 0.54 | 97 | 19.5 |
| Example 4 | 9.6 | 8.8 | 18.5 | 0.53 | 0.51 | 99 | 19.0 |
| Comparative Example 4 | 0.1 | 8.2 | 19.0 | 0.82 | 0.70 | 79 | 17.8 |
| Comparative Example 5 | 2.6 | 8.3 | 19.2 | 0.76 | 0.65 | 81 | 17.3 |
| Comparative Example 6 | 4.0 | 8.2 | 16.6 | 0.88 | 0.76 | 70 | 17.5 |

EXAMPLE 5

According to the method of Example 1, a yarn of 1,260 denier/2 was prepared. The dipping operation was carried out by using RF/L (1) shown in Table 1 in the following manner. Namely, the cord was treated at 150° C. under a tension of 2.8 kg/cord for 120 seconds in the first zones 9 and 9', treated at 225° C. under a tension of 2.8 kg/cord for 40 seconds in the second zone 10 and treated at 225° C. under a tension of 1.9 kg/cord for 40 seconds in the third zone 11. The RF liquids (A) and (B) were independently stirred for 6 hours, and the R/F liquids (A) and (B) were mixed at a ratio of 1/1 and the rubber latex was added to the mixture. The resulting mixture was stirred for 30 minutes to prepare the dipping liquid RF/L (1). The dipping liquid was then allowed to stand still for 24 hours and was then used for the dipping operation. The weight ratio of R/F (B) in the whole R/F was 50%. The properties of the obtained dip cord are shown in Table 4.

EXAMPLE 6

A yarn of 1,890 denier/2 was prepared according to the method of Example 2. RF/L (2) and RF/L (3) shown in Table 1 were mixed so that the weight ratio of of the obtained dip cord are shown in Table 4.

It is seen that a cord dipped according to the conventional method has a high strength but the elongation at break is low and the toughness is low.

COMPARATIVE EXAMPLE 8

The dipping operation was carried out in the same manner as described in Example 6 except that the mixing ratio of RF/L (2) and RF/L (3) was changed so that the weight ratio of R/F (D) in the total R/F was 15%. The properties of the obtained dip cord are shown in Table 4.

It is seen that if the weight ratio of R/F (D) in the total R/F is lower than 20%, the obtained dip cord is soft but the toughness is not improved.

COMPARATIVE EXAMPLE 9

The dipping operation was carried out in the same manner as described in Example 5 except that the R/F ratio of R/F (B) was changed to 1/0.9 or 1/2.0. The properties of the obtained dip cord are shown in Table 4.

It is seen that if the R/F ratio is higher than 1/1, the adhesion is reduced and if the R/F ratio is lower than 1/1.9, the toughness is not improved.

TABLE 4

| | R/F Ratio | Weight Ratio (%) in Total R/F | Strength (g/d) at Break | Elongation (%) under Load of 8 g/d | T.E. Coefficient | V.G. Value | Toughness | Adhesion (kg/cm) |
|---|---|---|---|---|---|---|---|---|
| Example 5 | 1/1.5 | 50 (B) | 8.6 | 19.4 | 0.63 | 0.59 | 94 | 17.5 |
| Example 6 | 1/1.25 | 25 (D) | 8.3 | 19.1 | 0.73 | 0.63 | 89 | 19.7 |
| Example 6 | " | 55 (D) | 8.5 | 19.3 | 0.68 | 0.60 | 93 | 19.2 |
| Example 6 | " | 75 (D) | 8.6 | 19.4 | 0.60 | 0.57 | 96 | 19.6 |
| Example 6 | " | 100 (D) | 8.7 | 19.6 | 0.52 | 0.52 | 99 | 19.8 |
| Comparative Example 7 | 1/2.0 | 0 | 8.2 | 19.9 | 0.80 | 0.70 | 86 | 17.8 |
| Comparative | 1/1.5 | 15 (D) | 8.2 | 19.5 | 0.79 | 0.65 | 87 | 17.5 |

TABLE 4-continued

| | R/F Ratio | Weight Ratio (%) in Total R/F | Strength (g/d) at Break | Elongation (%) under Load of 8 g/d | T.E. Co-efficient | V.G. Value | Toughness | Adhesion (kg/cm) |
|---|---|---|---|---|---|---|---|---|
| Example 8 Comparative Example 9 | 1/2.0 | 50 (B) | 8.2 | 19.6 | 0.76 | 0.67 | 85 | 17.6 |
| Comparative Example 9 | 1/0.9 | 50 (B) | 8.5 | 19.3 | 0.62 | 0.55 | 95 | 12.3 |

EXAMPLE 7

The dipping operation was carried out in the same manner as described in Example 3 except that RF/L (1) shown in Table 1 was used as the dipping liquid. The properties of the obtained dip cord are shown in Table 5.

From the results obtained in Example 7, it is seen that if the hereinbefore-mentioned processes B and C are employed in combination, the properties of the dip cord are further improved.

EXAMPLE 8

A chip of a high polymer of nylon 6 having a sulfuric acid relative viscosity of 3.8 was melt-spun through a spinneret having 280 orifices each having a diameter of 0.25 mm, and the spun yarn was wound in the undrawn state. Then, the yarn was drawn at a draw ratio of 5.25 at a drawing plate temperature of 190° C. to obtain a starting filament yarn of 1,680 denier/280 filaments having a strength of 10.2 g/denier and an elongation of 23.6%. First and second twists were given to the yarn at twist numbers of 34 turns/10 cm, respectively and a cord of 1,680 D/2 was prepared. According to the method described in Example 1, the cord was heat-set, cooled and dipped. In the first zone, the temperature of the zone 9 was 210° C. and the cord was treated for 100 seconds, and heating was not effected in the zone 9' and this zone 9' was used as the cooling zone. The cord was cooled for 50 seconds in the zone 9', and the cord was cooled to a temperature close to room temperature at the device 5. The elongation ratio in the zones 9 and 9' was 8.3%. Then, the cord was immersed in RF/L (2) shown in Table 1, and was treated at 150° C. at an elongation ratio of 2.0% for 50 seconds in the second zone 10 and treated at 200° C. at an elongation of −2.9% for 50 seconds in the third zone 11. The properties of the obtained dip cord are shown in Table 5.

EXAMPLE 9

According to the same procedures as described in Example 1, a mixture of 90 parts by weight of a high polymer of nylon 66 having a formic acid relative viscosity of 88.0 and 10 parts by weight of a polymer of nylon 6 having a sulfuric acid relative viscosity of 3.4 was melt-spun to obtain a starting filament yarn of 1,260 denier/210 filaments having a strength of 10.2 g/denier and an elongation of 22.1%. In the same manner as described in Example 5, the starting filament yarn was twisted and dipped. The properties of the obtained dip cord are shown in Table 5.

EXAMPLE 10

The dipping operation was carried out in the same manner as described in Example 2 except that RF/L (3) shown in Table 1 was used as the dipping liquid. The properties of the obtained dip cord are shown in Table 5. It is seen that the product of this example wherein the hereinbefore-mentioned processes A and C were employed in combination is improved in the strength, elongation, toughness and softness over the product of Example 2.

EXAMPLE 11

The dipping operation was carried out in the same manner as described in Example 10 except that an elongation of 4% was given to the cord when it was immersed in RF/L. The properties of the obtained dip cord are shown in Table 5. It is seen that, in this example wherein the hereinbefore-mentioned processes A, B and C were employed in combination, the weight of a tire can be reduced without reduction of the properties of the tire.

TABLE 5

| | Strength (g/d) at Break | Elongation (%) under Load of 8 g/d | T.E. Co-efficient | V.G. Value | Toughness | Adhesion (kg/cm) |
|---|---|---|---|---|---|---|
| Example 7 | 8.6 | 19.3 | 0.58 | 0.54 | 101 | 17.3 |
| Example 8 | 8.6 | 21.0 | 0.53 | 0.49 | 104 | 18.0 |
| Example 9 | 8.5 | 19.0 | 0.60 | 0.57 | 98 | 17.8 |
| Example 10 | 8.7 | 18.8 | 0.53 | 0.49 | 105 | 19.2 |
| Example 11 | 8.8 | 18.3 | 0.51 | 0.47 | 106 | 18.7 |

I claim:
1. A tire-reinforcing dip cord composed of fibers of at least one polyamide selected from the group consisting of nylon 6 and nylon 66 said dip cord having the following characteristics:
   (1) a strength at break of at least 8.2 g/d;
   (2) an elongation of at least 18% under a load of 8 g/d;
   (3) a gradient (T.E. coefficient) not larger than 0.75 in the load-elongation curve immediately before break; and
   (4) a cord diameter variation ratio (V.G. value) not larger than 0.65, said cord diameter variation ratio being expressed by the ratio (D/Do) of the cord diameter (D) under a load of 450 g to the cord diameter (Do) under no load.
2. A dip cord according to claim 1 wherein said dip cord has a strength at break of 8.4 to 9.0 g/d.
3. A dip cord according to claim 1 wherein said dip cord has an elongation of 18 to 30% under a load of 8 g/d.
4. A dip cord according to claim 1 wherein said dip cord has a gradient of 0.30 to 0.70 in the load-elongation curve immediately before break.
5. A dip cord according to claim 1 wherein said dip cord has a cord diameter variation ratio of 0.40 to 0.60.
6. A dip cord according to claim 1 wherein said dip cord has (a) an elongation of 7 to 11% under a load of

2.68 g/D (D represents the total denier of the starting filament yarn used for the preparation of the dip cord), (b) a dry heat shrinkage of 2 to 9% as measured under relaxed conditions at 160° C. for 30 minutes, and (c) a twist coefficent K (which is defined by the equation of $K=T\times\sqrt{D}$ wherein T is the twist number per 10 cm and D is the same as defined above) falling in the range of $1,700 \leq K \leq 2,200$, and contains 3 to 7% by weight of an adhesive.

* * * * *